Patented Jan. 28, 1930

1,745,017

UNITED STATES PATENT OFFICE

EMILY R. KNODELL, OF ST. JOHN, NEW BRUNSWICK, CANADA

ADHESIVE

No Drawing.  Application filed September 16, 1927. Serial No. 220,058.

This invention relates to an adhesive composition of the consistency of paste and provides an article that will not deteriorate readily and which may be cheaply prepared.

The following ingredients are employed in about the proportions stated to make two gallons of the paste:

| | |
|---|---|
| Oatmeal | 2 lbs. |
| Tapioca | 3 oz. |
| Water glass | ½ pt. |
| Salt | 3 oz. |
| Plaster Paris | 1 dessertspoonful |
| Wheat flour | ½ cup |
| Essence of lemon | 1 dessertspoonful |
| Water, sufficient to make two gallons of composition. | |
| Alcohol compound | 1½ oz. |

The oatmeal and three pints of water are placed in a vessel and kept warm for about three hours. One quart of water is then added to the contents of the vessel which is allowed to simmer for approximately three hours, the salt being added at intervals and stirred in. The tapioca is allowed to soak in cold water for about three hours and then placed upon a stove and allowed to simmer gently for approximately two hours, or until quite soft, then add cold water to produce a jellied mass. The jellied tapioca is added to the cooked oatmeal together with sufficient water to produce a mixture of the consistency of gruel that will not run from a spoon. The wheat flour is mixed with water to the consistency of thick syrup and is gradually added to the mixture of oatmeal and tapioca. The water glass is heated and the plaster Paris slowly added thereto. The mixture of water glass and plaster Paris is gradually added to the mixture of oatmeal, tapioca and flour. The composition is set aside and when luke warm is strained. The essence of lemon is added to the strained mass and, if necessary, warm water is added to produce a paste of the consistency of thick syrup when cool. The essence of lemon functions as a deoderant and may be replaced by any other preferred perfumerant. The alcohol compound consists of grain alcohol, 1 fluid oz., brucine sulphate $\frac{1}{32}$ gr. and diethyphthalate 2¼ per cent. Its chief purpose is a preservative and while preferred may be replaced by any commercial alcohol, which is added after the mass has been strained and prior to its cooling. The perfumerant and alcohol may be mixed and gradually added to the mass and thoroughly stirred in. The composition thus produced will not deteriorate and should be kept in a cool place and away from the air.

The paste is adapted for general use as an adhesive and is particularly designed for securing wax paper to cardboard, also as a cement for leather, sheet metal and other materials.

Having thus described the invention, I claim:

An adhesive composition of pasty consistency comprising oatmeal, tapioca, water glass, salt, plaster Paris, wheat flour, alcohol and a perfumerant.

In testimony whereof I affix my signature.

EMILY R. KNODELL. [L. S.]